Oct. 18, 1938.  K. H. SCHLAEFKE  2,133,478
INTERNAL COMBUSTION ENGINE
Filed Oct. 21, 1936  2 Sheets-Sheet 1
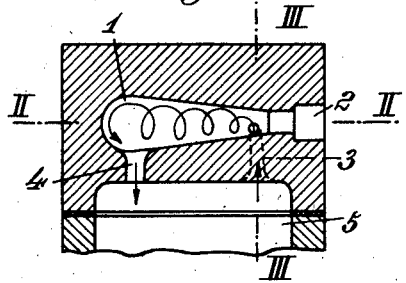
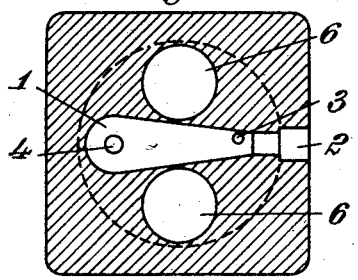
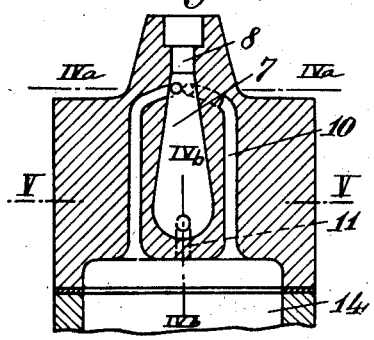
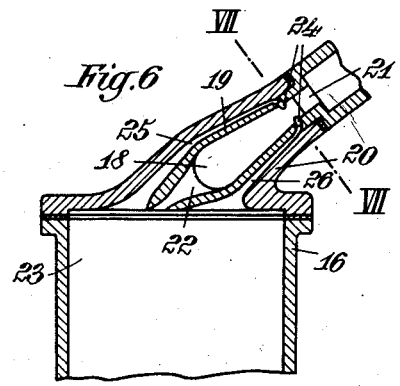
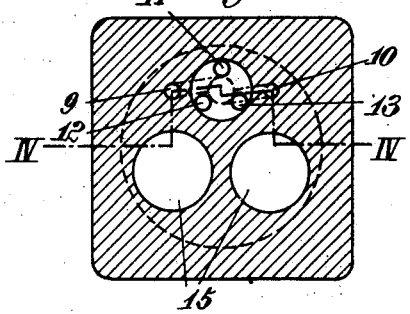
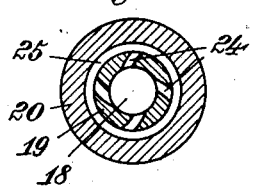
Inventor:
KARL HANS SCHLAEFKE
BY
ATTORNEYS Oct. 18, 1938.                K. H. SCHLAEFKE                2,133,478
                         INTERNAL COMBUSTION ENGINE
                           Filed Oct. 21, 1936          2 Sheets-Sheet 2

INVENTOR
Karl Hans Schlaefke.
BY
Harness, Dickey & Pierce
ATTORNEYS.

Patented Oct. 18, 1938

2,133,478

UNITED STATES PATENT OFFICE 2,133,478

INTERNAL COMBUSTION ENGINE

Karl Hans Schlaefke, Frankfort-on-the-Main, Germany, assignor to Adlerwerke vorm. Heinrich Kleyer Aktiengesellschaft, Frankfort-on-the-Main, Germany Application October 21, 1936, Serial No. 106,727
In Germany October 31, 1935

8 Claims. (Cl. 123—33)

The invention relates to an internal combustion engine in which the fuel is injected into a combustion chamber which has a constricted communication with the working space of the cylinder and is of a size only slightly smaller than that of the entire compression space of the cylinder.

In all injected fuel internal combustion engines one of the main problems is to reduce the delay in ignition as far as possible, as the smooth running of the machine is largely dependent thereon. Apart from the air density, the composition of the mixture (amount of excess air) and the degree of atomization (injection pressure), the degree of turbulence is one of the external factors which considerably affects the commencement of the self-ignition and thus the magnitude of the delay in ignition.

Consequently, many and diverse measures have already been proposed in order to improve the turbulence of the air in the combustion chamber both in respect of its nature and its extent. It is important that the whirl of the air should as far as possible occur in a well defined direction so as to prevent with certainty the conveyance of exhaust gas instead of fresh air to the fuel particles by the whirl. The object of the invention is to ensure by simple means that whirling should be produced to an adequate extent in an invariable defined direction in the combustion chamber.

This object is attained in that the combustion chamber communicates with the working chamber by way of two conduits or sets of conduits of which one is so constructed that the resistance to flow therethrough is greater for a flow towards the combustion chamber than in the opposite direction, and the other so that the resistance to flow therethrough is greater for a flow towards the working space of the cylinder than in the opposite direction. In this way an invariably constant direction of flow is produced both by the reciprocating working piston and by the excess pressure within the combustion chamber. When the working piston moves upwardly, the air is forced with greater speed through the conduit which has a relatively smaller resistance to flow for a flow towards the combustion chamber, whereas the speed of the air which passes through the other conduit or set of conduits, in which the relative resistance to flow is greater for a flow towards the combustion chamber, is materially smaller. Consequently, there results in the combustion chamber a relative flow of air which is directed from the end of the conduit or group of conduits, which has a smaller resistance to flow for a flow towards the combustion chamber, to the end of the conduit (group of conduits) which has a greater resistance to flow for a flow towards the combustion chamber.

On the return stroke of the working piston, this direction of flow persists irrespective of whether the combustion creates an excess pressure in the combustion chamber or whether the working piston draws in fresh air. During these working operations the gas in the combustion chamber will be forced or drawn at relatively high speed through the conduit in which the relative resistance to flow is smaller for a flow towards the working space of the cylinder, whereas the speed of the gas which emerges from the conduit in which the relative resistance to flow is greater for a flow towards the working space of the cylinder, remains small. Thus in this case also, the flow in the combustion chamber is directed from the end of the conduit which has a smaller resistance to flow for a flow towards the combustion chamber, to the end of the conduit which has a greater resistance to flow for a flow towards the combustion chamber.

The effect of the inventive feature is that superimposed on the alternating flow which is produced by the working piston or by the excess pressure created in the combustion chamber by the combustion, is a flow which is constantly directed from the end of one conduit (group of conduits) to the end of the other conduit (group of conduits).

Preferably the effect of the different resistances to flow for flows in the two directions in the conduits, is increased by making two conduits or groups of conduits of different cross sections. In general, it will be advisable for the cross section of the conduit (group of conduits) which has a smaller resistance to flow for a flow towards the working space of the cylinder, to be somewhat greater than the cross-section of the other conduit (group of conduits). In this way a particularly easy transfer of the gas from the combustion chamber to the working space of the cylinder is obtained during the combustion without excessively high pressures occurring in the combustion chamber.

The most diverse methods are possible for making the resistances to flow in the conduits different in the two directions. For example, the conduits may for this purpose be provided with hooks pointing in the direction of flow or otherwise formed to make the conduits more or less effective as non-return valves which interrupt or retard the flow therethrough in one direction. In the present arrangement, the difficulties generally arising on providing moving parts within the combustion space are reduced as these non-return valve-like conduits do not need to close tightly in the closed position. A particularly simple and appropriate construction resides in forming the connecting conduits after the manner of nozzles in such a way that the transition to the smallest cross section occurs gradually on one side and abruptly on the other side.

A particularly suitable utilization of the flow within the combustion chamber is obtained if the conduit in which the relative resistance to flow is smaller for a flow towards the combustion chamber, discharges into the combustion chamber tangentially. In this way a whirling flow of air which ensures a particularly long path of the air and the direction of flow of which is satisfactorily determined, is obtained within the combustion chamber. It is advisable for the other conduit or group of conduits also to enter the combustion chamber tangentially in such manner that the whirling flow is assisted.

The arrangement of the conduits or groups of conduits is preferably such that where the ends of the connecting conduits are substantially tangential to the combustion chamber, the section of the latter is disposed approximately at right angles to the direction of the jet of fuel. In this way a progressive whirling of the air is obtained along the jet of fuel. To assist this longitudinal flow it is advisable that the conduit which has a relatively smaller resistance to flow for a flow towards the combustion chamber be inclined somewhat with respect to the cross section of the combustion chamber which is at right angles to the jet of fuel, the inclination being towards the conduit which has a relatively greater resistance to flow for a flow towards the combustion chamber. In a corresponding way the last mentioned conduit may be arranged so as to be inclined in the opposite direction.

In general, the conduit or groups of conduits exhibiting a smaller resistance to flow for a flow towards the combustion chamber is preferably arranged in such manner that it terminates in the chamber approximately at the point at which the jet of fuel enters the chamber, whereas the other conduit or group of conduits which have a smaller resistance to flow for a flow towards the working space of the cylinder terminates approximately at that side of the combustion chamber which is remote from the point of entry of the jet of fuel. The invention can be utilized with the most diverse forms of combustion chambers. Preferably the combustion chamber is pear shaped in such a manner that the jet of fuel enters the chamber approximately at the smallest cross section.

A particularly convenient embodiment of the inventive idea resides in that the conduit or group of conduits in which the relative resistance to flow is smaller for a flow towards the combustion chamber than for a flow in the opposite direction, embraces the combustion chamber wholly or in part. In this embodiment the combustion chamber is suitably in the form of a constructional element which is inserted separately. In this way the chamber is adequately cooled and nevertheless is maintained at a definite temperature which remains constant to a certain extent even with variations in the quantity of air supplied. This is particularly valuable in view of the fact that in some circumstances it has been found to be advantageous even for Diesel engines to regulate not only the quantity of fuel but also the quantity of air in accordance with the varying load.

Certain embodiments of the invention are shown diagrammatically by way of example in the accompanying drawings in which Fig. 1 is a longitudinal section through a cylinder head and the upper part of the working space of the cylinder.

Fig. 2 is a plan view in section along the line II—II of Fig. 1.

Fig. 3 is a section along the line III—III of Fig. 1.

Figs. 4 and 5 show another embodiment of the invention, Fig. 4 being a section through the cylinder head and the upper part of the cylinder along the line IV—IV of Fig. 5 and Fig. 5 a section along the line V—V of Fig. 4.

Fig. 6 is a section through the cylinder head and the upper part of the cylinder of a further embodiment of the invention, and Fig. 7 is a fragmentary section along the line VII—VII of Fig. 6 on a larger scale.

Figure 4B:
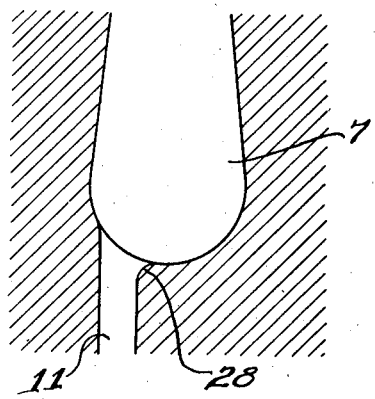
Figs. 4a and 4b are enlarged fragmentary sectional views taken on the lines IVa—IVa and IVb—IVb respectively, of Fig. 4.

In Figs. 1 and 2, the fuel nozzle is inserted into the combustion chamber 1 at the point 2. Approximately at the point where the jet of fuel enters the combustion chamber 1, a conduit 3 communicates with the combustion chamber. The resistance to flow in this conduit for a flow towards the combustion chamber is smaller than for a flow in the opposite direction. As shown in Fig. 3 this conduit 3 enters the chamber approximately tangentially.

The combustion chamber 1 is substantially pear-shaped. Approximately at the maximum diameter of the pear shaped space and on the side remote from the point of entry of the jet of fuel, a conduit 4 communicates with the diameter. For a flow towards the combustion chamber, the resistance to flow in this conduit is greater than for a flow in the opposite direction.

The two conduits 3 and 4 connect the combustion chamber 1 with the working space 5 of the cylinder. The size of the combustion chamber is only slightly smaller than the total compression space of the cylinder as the distance between the upper edge of the piston and the end of the cylinder is made as small as is permissible having regard to safety in operation.

The junction of the conduit 3 with the working space of the cylinder is rounded off considerably whereas its junction with the combustion chamber is provided with sharp edges. Conversely the point of entry of the conduit 4 into the combustion chamber is well rounded off and the termination at the working space of the cylinder is sharp edged so that for both conduits a different resistance to flow for flows of opposite directions is obtained due to the effect of this nozzle-like construction. Of the openings indicated at 6 in the plan view, one is intended for the inlet valve and the other for the outlet valve.

The relative cross sectional areas of the conduits 3 and 4 are immaterial. By the rounded off edge of the conduit 3 leading to the working space, and the sharp edge leading to the combustion chamber, the conduit 3 offers a greater resistance to flow from the combustion chamber to the working space than it does from the working space to the combustion chamber. As the point of entry of the conduit 4 into the combustion chamber is rounded off and the point of entry into the working space has a sharp edge, the conduit 4 offers less resistance to flow from the combustion chamber to the working space than it does from the working space to the combustion chamber. For repeated cycles there will therefore be a general flow of gas within the combustion chamber 1 from the conduit 3 toward the conduit 4. This will be evident when it is considered that for a pressure above the conduits 3 and 4, a particle of gas will flow toward the conduit 4 with less resistance and will flow toward or through the conduit 3 with greater resistance than is the case when a pressure is applied to the working chamber. When a pressure is applied to the working chamber these same particles will be moved back toward their original positions, in which event the particle or stream which moves toward or through conduit 4 will be moved back a less distance than it was moved forward for the pressure within chamber 1. The particle within chamber 3 will be moved back toward its original position a greater distance for the pressure in the working position than it was moved toward the conduit 3 for the pressure in the combustion chamber. In effect, differences in resistance will cause this latter named particle to have moved past its original position toward conduit 4. The result is that for cycles of operation, the resultant movement of the particles is toward the conduit 4. This is true regardless of the relative areas of the conduits 3 and 4 and is caused by the conduits having differences in resistance to flow in opposite directions.

Figure 8:
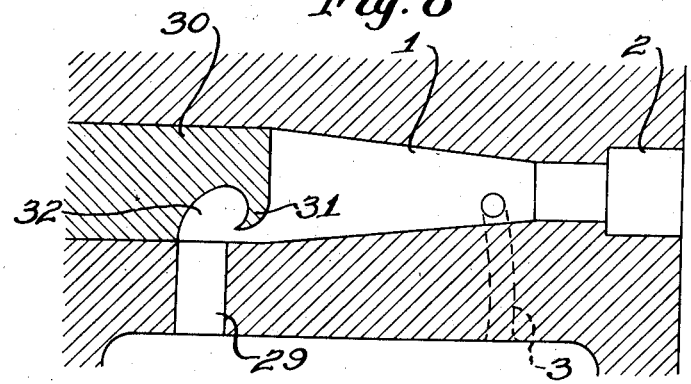
Fig. 8 is an enlarged fragmentary view similar to Fig. 1 and illustrating a modified form of construction.

The same effect of obtaining a relatively greater flow of air from the combustion chamber 1 toward the working space in the engine cylinder than in the opposite direction as is obtained by flaring the upper end of the conduit 4 in Fig. 1 may be obtained in the manner illustrated in Fig. 8. This latter figure illustrates the hooked construction previously referred to in that the conduit or passage 29, corresponding with the passage 4 previously described, has sharp edges where it enters the working space in the cylinder. Its opposite end by means of which it communicates with the combustion chamber 1 is reversely curved as at 32 and is partially baffled from the chamber 1 by the baffle 31 which is more or less hooked toward the corresponding end of the conduit 29. As will be understood the provision of the hook or baffle 31 will assist and increase the retarding effect of the sharp lower edges of the conduit 29 in resisting flow through the conduit 29 toward the chamber 1, but will not materially increase the resistance to flow therethrough in the opposite direction; i. e. from the chamber 1 toward the working space of the engine cylinder.

Figs. 4, 4a, 4b and 5 show another arrangement of the combustion chamber. Whereas in Figs. 1 and 2 the combustion chamber is arranged at right angles to the direction of the stroke of the piston, in the embodiment according to Figs. 4 and 5 the combustion chamber 7 lies in the direction of the stroke of the piston.

Figure 4A:
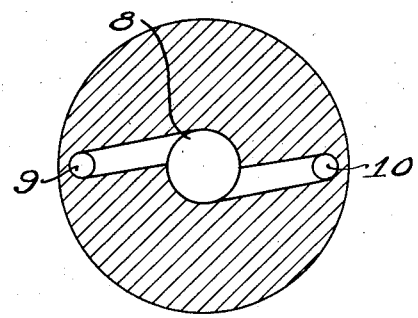

The fuel nozzle is introduced into the combustion chamber at the point 8. The two conduits 9 and 10 which have a smaller resistance to flow for a flow towards the combustion chamber than for a flow in the opposite direction enter the chamber approximately at the point where the fuel jet enters the chamber. In this embodiment also the combustion is somewhat pear-shaped. Three conduits 11, 12, 13 which have a greater resistance to flow for a flow towards the combustion chamber than for a flow in the opposite direction enter the combustion chamber at its lower end, i. e. at the point where it is of approximately maximum cross section. The conduits 9 and 10 and the conduits 11, 12, 13 may enter the combustion chamber substantially tangentially as illustrated in Fig. 4a. The means whereby a different resistance to flow is obtained for the different directions of flow is similar to that employed in Figs. 1, 2 and 3. In other words, the lower ends of the conduits 9 and 10 are flared outwardly as indicated at 27 in Fig. 4 so that the resistance to flow therethrough from the working space in the engine cylinder toward the combustion chamber 7 is less than for a flow in the opposite direction. The end of the conduit 11 at the point where it enters the working space of the engine cylinder is provided with sharp edges while the opposite end where it enters the combustion chamber 7 is flared as indicated at 28 in Fig. 4b, the result being that the resistance to flow through the conduit 11 is greater in the direction from the working space in the engine cylinder toward the combustion chamber 7 than in the opposite direction.

Here again the conduits 9 and 10 and the conduits 11, 12 and 13 constitute a connection between the combustion chamber 7 and the working space 14. One of the two openings 15 serves to receive the inlet valve and the other to receive the exhaust valve.

The construction and arrangement of the combustion chamber can be modified to a far-reaching extent. For example, the combustion chamber may be arranged relatively to the longitudinal axis of the cylinder at any angle departing from 90°.

In Fig. 6 the combustion chamber 18 is somewhat pear-shaped as in the preceding embodiments and is constituted by a separate insertion 19 which is mounted in a neck-shaped portion 20 of the cylinder head. The fuel nozzle is introduced at the point 21. Arranged opposite the point of entry of the jet of fuel on the extension of the axis of the fuel nozzle is the conduit 22 which forms a connection between the combustion chamber 18 and the working space 23. The conduit 22 is constructed in the form of a nozzle in such manner that its resistance to flow for a flow towards the combustion chamber is greater than for a flow in the opposite direction.

The neck-shaped part 20 of the cylinder head embraces the insertion 19 constituting the combustion chamber 18 in such manner than an annular conduit is formed about the combustion chamber and the longitudinal sections 25, 26 of the annular conduit are nozzle-shaped. This annular conduit terminates approximately at the point of entry of the jet of fuel into the combustion chamber 18 at openings 24 which are approximately tangential to the cross section which is disposed at right angles to the direction of the jet of fuel. The nozzle-like form of the individual longitudinal sections 25, 26 is such that their resistance to flow for a flow towards the combustion chamber is smaller than for a flow in the opposite direction.

In this embodiment there is therefore a flow of uniformly constant direction along the annular conduit through the openings 24 and along the combustion chamber 18 back to the working space.

Figure 9:
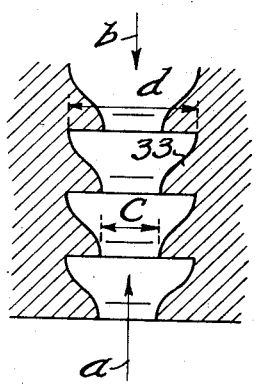
Fig. 9 is an enlarged fragmentary sectional view taken axially through a modified form of construction.

In Fig. 9 is illustrated another form of hooked conduit construction that may be employed for the conduits connecting the combustion chamber with the working space in the engine cylinder in order to obtain a greater resistance to flow therethrough in one direction than in the opposite direction. The construction shown in Fig. 9 has the effect of providing multiple hooks. The conduit is shown as being interiorly provided with a plurality of axially spaced radially inwardly projecting annular hook-sectioned ribs or baffles 33. The maximum diameter of the conduit is illustrated at $d$ and as occurring axially between the baffles 33. The minimum diameter is illustrated at $c$ and as occurring at the points of the hooks. The lower face of each baffle 33 as viewed in Fig. 9 is disposed radially of the conduit and terminates at its radially inner edge in a sharp edge. The upper face of each baffle 33 as viewed in Fig. 9 is gradually curved from its outer diameter $d$ to its inner diameter $c$ in a manner such as to promote ease of fluid flow thereover in such direction. The result of this construction is that air or other fluid attempting to flow through the conduit in the direction of the arrow $a$ meets and is retarded by contact with the successive radially extending shoulders of the baffles 33 which also exercise a wire drawing effect in the flow of the fluid over their sharp radially inner edges, while fluid flowing through the conduit in the opposite direction indicated by the arrow $b$, flows over the smoothly curved upper surfaces of the baffles 33 which accordingly offer very little resistance and substantially no wire drawing effect to such flow. Thus the resistance to flow through the conduit in the direction of the arrow $a$ is materially more than in the direction of the arrow $b$. In employing this form of conduit in any of the previously described constructions the conduits will, of course, be arranged with the radially disposed faces of the baffles 33 facing the direction in which less resistance to flow through the conduit is desired.

Formal changes may be made in the specific embodiments of the invention described without departing from the spirit or substance of the broad invention, the scope of which is commensurate with the appended claims.

I claim:—

1. An internal combustion engine of the kind set forth, including a combustion chamber, conduits extending between said combustion chamber and the working space of the cylinder and providing independent paths of flow between them, at least one of said conduits offering a greater resistance to a flow towards the combustion chamber than to a flow in the opposite direction, whereas the remainder of said conduits offer a greater resistance to a flow towards the working space than to a flow in the opposite direction, and means for injecting fuel into said combustion chamber in a direction generally from said remainder of said conduits toward said one of said conduits.

2. An internal combustion engine according to claim 1, in which each conduit is constructed with an outwardly flared wall at one end and a relatively sharp edge at the other end.

3. An internal combustion engine according to claim 1, in which each conduit having a greater resistance to a flow towards the working space than for a flow in the opposite direction is formed substantially tangential to the walls of the working chamber.

4. An internal combustion engine according to claim 1, in which all of said remaining conduits are formed substantially tangential to the walls of the working chamber.

5. An internal combustion engine according to claim 1, in which each of said remaining conduits is formed substantially tangential to the walls of the working chamber at a plane which is located approximately at right angles to the direction of the fuel jet.

6. An internal combustion engine of the kind set forth including a combustion chamber and means for injecting fuel thereinto, conduits opening into the working space of the cylinder independently of one another extending between the working space of the cylinder and the combustion chamber remote from the point of entry of the fuel, at least one conduit offering a greater resistance to flow for a flow towards the combustion chamber than for a flow in the opposite direction, and extending between the working space of the cylinder and the combustion chamber adjacent the point of entry of the fuel, at least one further conduit offering a smaller resistance to flow for a flow towards the combustion chamber than for a flow in the opposite direction.

7. An internal combustion engine of the kind set forth including a combustion chamber, conduits extending between said combustion chamber and the working space of the cylinder having openings entering said combustion chamber independently of each other to provide independent communications between the engine cylinder and the combustion chamber, at least one of said conduits offering a greater resistance to a flow towards the combustion chamber than to a flow in the opposite direction, whereas the remainder of said conduits offer a greater resistance to a flow towards the working space than to a flow in the opposite direction and extend at least in part around the combustion chamber, and means for injecting fuel into said combustion chamber in a direction generally from said remainder of said conduits toward said one of said conduits.

8. An internal combustion engine of the kind set forth including a combustion chamber and means for injecting fuel thereinto, a conduit extending between the working space of the cylinder and the combustion chamber remote from the point of entry of the fuel, said conduit offering a greater resistance to flow for a flow towards the combustion chamber than for a flow in the opposite direction, and at least one other conduit extending between the working space of the cylinder and the combustion chamber adjacent the point of entry of the fuel, the last mentioned conduit offering a smaller resistance to flow for a flow towards the combustion chamber than for a flow in the opposite direction and embracing the combustion chamber at least in part, said conduits having independent openings leading into said combustion chamber to provide independent communication between the engine cylinder and the combustion chamber.

KARL HANS SCHLAEFKE.